April 10, 1928.
J. W. HARRIS
1,665,851
ELECTRIC BUTT WELDED TUBING AND METHOD OF MAKING THE SAME
Filed Sept. 26, 1924
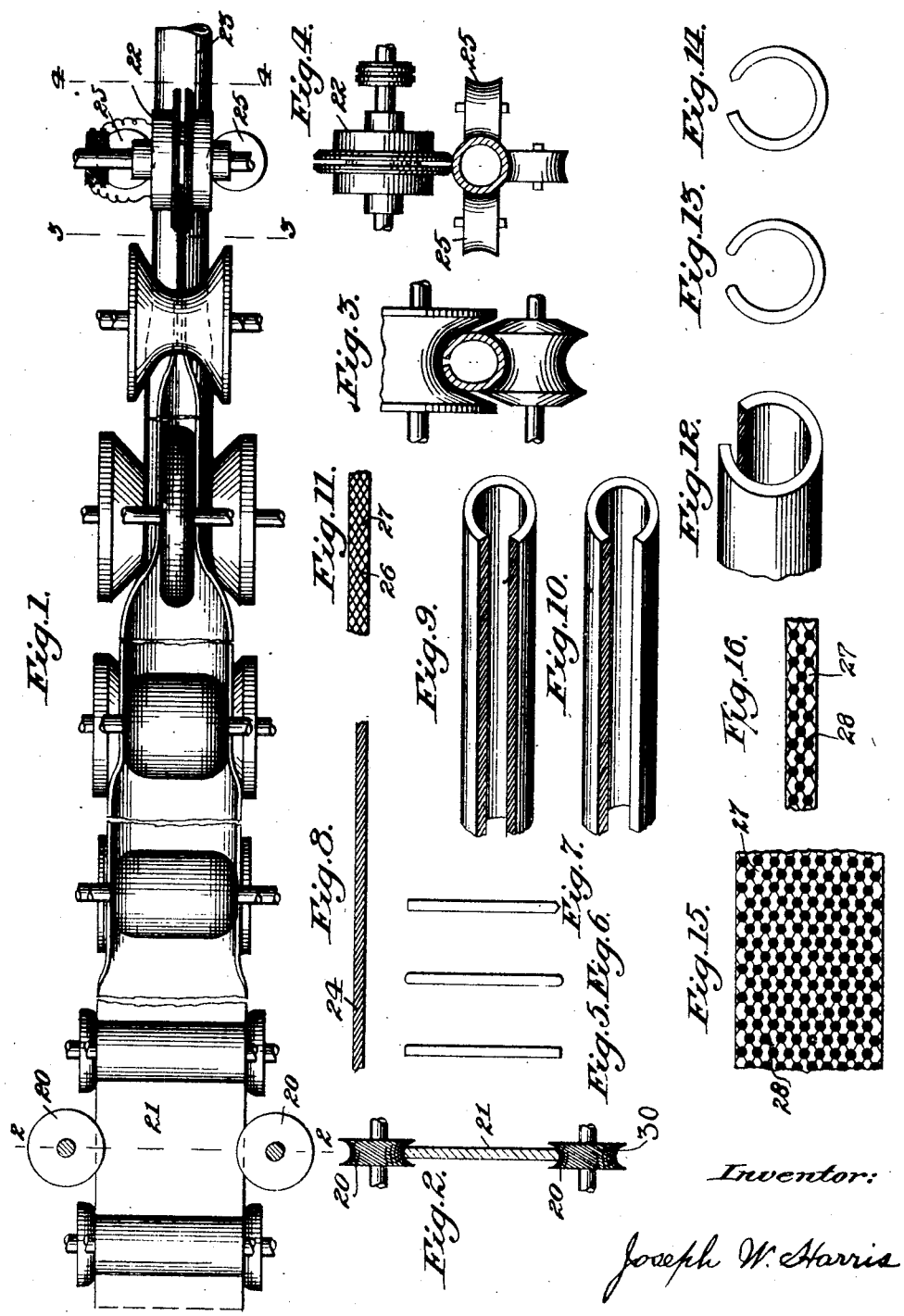
Inventor:
Joseph W. Harris Patented Apr. 10, 1928.

1,665,851

UNITED STATES PATENT OFFICE.

JOSEPH W. HARRIS, OF WASHINGTON, DISTRICT OF COLUMBIA.

ELECTRIC BUTT-WELDED TUBING AND METHOD OF MAKING THE SAME.

Application filed September 26, 1924. Serial No. 740,070.

This invention relates to the art of electric seam welding, and more particularly to the art of electric tube butt welding.

An object of the invention is to provide a means whereby an improved contact will be made between the edges to be welded.

A further object is to provide a means whereby oxidation films on the edges of skelp will be penetrated, and electric contact made with the metal beneath such films.

A further object is to provide a skelp with a serrated edge, the serrations or teeth on one side of the skelp placed so that when the skelp is formed into a tube, and the serrations on one edge brought into contact with the serrations on the other edge, the opposing serrations will cross each other.

A further object is to form the serrations on the skelp just before the time of welding, in order to avoid oxidation and possible deformation of the teeth by mechanical handling.

A further object is to provide a means whereby at the points of contact of the edges of the tube with each other, at the sharp ridges of the serrations or teeth, intensely heated very plastic particles or minute drops of molten metal will be produced by the welding current and mechanically retained by the adjacent surfaces of the contracting edges, the intensely heated drops of metal fusing unfused metal of the adjacent surfaces of the serrations and alloying therewith, and thereby producing a weld entirely within the contracting edges.

A further object is to produce an area of cooperating interlaced recesses within the abutting edges to be welded which collectively provide a thin chamber or mold to retain the melted metal produced by the welding current, and which melted metal fuses and unites with the walls of the cooperating interlaced recesses between and within the abutting edges.

A further object is to provide a welded tube, the welded joint of which may be substantially honey-combed with spot welds.

A further object is to provide a means whereby under the same conditions of working an improved and stronger welded joint is obtained.

A further object is to provide skelp with a contacting edge which possesses the above enumerated properties.

A further object is to provide a method of electric tube welding by which a strong firm weld is made and which is confined within the inner and outer surface walls of the tube.

A further object is to provide a welding machine which serrates the edges of the skelp while it is being shaped into a tube form, thereby avoiding any possibility of the serrated edges being damaged and also insuring that the serrated edge will be maintained free from dirt and oxidation, a condition that would be difficult to avoid if the skelp had been separately treated in a prior operation to make the serrations, and the skelp then subjected to handling and transportation.

Further objects will appear upon reading the specification.

In the accompanying drawings:

Figure 1 illustrates one type of skelp forming train with an electric welding roll at the finishing end;

Fig. 2 is a section on the line 2—2 of Fig. 1, showing the serrating rolls in elevation with a strip of skelp between;

Fig. 3 is a view of a section on the line 3—3 of Fig. 1, showing the final forming rolls in elevation;

Fig. 4 is a view of a section on the line 4—4 of Fig. 1 showing the welding roll and side-pressure rolls in elevation supporting the tube;

Figs. 5, 6 and 7 are exaggerated views of cross sections of different shapes of skelp, each having different types of edges;

Fig. 8 is an exaggerated view of a serrated edge on a skelp strip after passing through the serrating rolls;

Fig. 9 and 10 are exaggerated views in perspective of nearly closed skelp, showing the serrated edges;

Fig. 11 is an exaggerated illustration of how the sharp edges of the teeth on each side of the tube shown in Fig. 9 will contact with each other, the meshes furnishing recesses for molten metal;

Fig. 12 is a view in perspective of a partly closed skelp having flat edges;

Figs. 13 and 14 are end views of partly closed skelps having different types of edges;

Fig. 15 is a very greatly enlarged illustration of the multiplicity of spot welds, resembling a net work formed at the intersecting contacts of the opposing serrations within the welded joint; and Fig. 16 is a very greatly enlarged illustration of the multiplicity of spot weld points formed at the intersecting contacts of the opposing serrations within the welded joint of a thin wall tube.

The invention may be applied to welding thin wall, as well as thick wall tubing, and the electric current applied may be alternating or continuous.

In Fig. 1 a conventional type of skelp shaping machine is illustrated to which is added a pair of serrating rolls 20, 20, the skelp being indicated at 21; the serrated skelp being drawn along through the forming rolls and electrically welded by a welding roll, one type of which is shown at 22, the welded tube being shown at 23.

The skelp 21 may have any desirable shape, it may have flat edges, as shown in Figs. 5 and 12, or rounded edges, as in Figs. 6 and 13, or one flat and one longitudinal ridge, as in Figs. 7 and 14, or any combination of different edges. The type of serrating rolls 20 will be selected according to the type of edge on the skelp used. The rolls 20 shown in Fig. 2 are provided with curved surfaces to operate upon skelp having curved edges, as shown in Fig. 6. The rolls 20 have sharp cutting teeth 30, and are arranged to exert a very heavy pressure against the edges of the skelp, and to cut into, and produce serrated edges resembling a fine cut file, having sharp teeth. The serrating also has the effect of breaking up the film of oxid on the edges of the skelp. The teeth 30 on the serrating rolls 20 may also be regarded as an intermittent film cutting and ridge forming agent, which, as the rolls rotate, progressively cut the surface film on the metal skelp and produce an intermittent series of elevated ridges in the surface operated upon, exposing intermittent areas of clean unfilmed metal at the elevated ridges. Owing to the great pressure exerted by the rolls 20, the teeth, or serrations, 24, Fig. 8, on the skelp which are preferably made as sharp as practicable are denser than the remaining metal, and when the skelp is finally formed into a tube, and the edges pressed together under adjustable pressure, herein shown as being done by the welding roll 22 and the supporting rolls 25, the sharp edges of the teeth or serrations 24 on one side will cut into or puncture the teeth or serrations, or smooth metal, on the other side, forming a "cross-hatching" contact, resembling a network and making excellent metallic electric contact with the clean metal below the surface at the points of contact, 26, as indicated in Fig. 11. The controlled electric welding current should be such as to raise the metal at the points of contact to a very high temperature within the range of welding plasticity or of localized fusion, the temperature of the plastic or fused metal may be such that some of its heat will be imparted to the adjacent metal just back of the fused metal so as to fuse or plasticize said adjacent metal, the local temperature being such that the plastic or molten contacting crests will spread or flow into the recesses 27 or tooth valleys. The combined effect of the recesses on the contacting edges is to retain intensely heated metal, which aided by the electric current, serves to fuse or weld the two edges into a strong weld. Skelp having edges such as shown in Figs. 6, 13 and 7 and 14, with serrations on one or both edges, first make contact along the longitudinal ridges of the edges, which first soften under the influence of the welding current, and then flow due to the controlled pressure of the rolls 22 and 25, around the points of contact welding them together, the extent of the flow of metal being controlled by the pressure of the rolls 22 and 25 and the strength of the electric current, the intensely heated drops of metal fusing or platicizing metal on both edges, as described above, and producing a clean metal-to-metal welded joint at the points of contact.

It will be noted by those skilled in the art that since the edges to be welded make contact with each other at the intersecting points only, and since such contact points offer much higher resistance than surface contacts having a greater area, a much higher percentage of the energy of the current in the welding circuit will be utilized at the weld than when the usual edge surface contact of larger area is used, resulting in an increased efficiency of operation. The electric energy consumed at the contact points is, relatively, so very concentrated, that it will greatly increase the temperature of the melted metal produced as noted above, and in turn, permit an increase in speed of operation of the welding machine.

The pressure applied to the shaped skelp varies with the size of the welding throat, an increase in mechanical pressure is produced by a decrease in the size of the throat. With relatively low mechanical pressure herein shown as being applied by the rolls 22, 25, and relatively low electric welding current, the welds will be around the points of contact of opposing teeth or serrations, producing a multitude of small spot welds 28 within the joint, Figs. 15 and 16, a joint honey-combed with spot welds; with increased mechanical pressure applied by the rolls 22, 25, and increased strength of electric welding current the spot welds will spread over a greater area, will be larger and closer together; with still further increase in mechanical pressure and current strength, the spot welds will coalesce or merge into each other, forming a continuous homogeneous weld. The use of skelp with rounded edges, as shown in Figs. 2 and 6, provides low areas on both sides of the joint for the metal to flow into, and produce surfaces flush with the tube.

The combined machine which both forms the serrations on the skelp and welds the fresh serrated edges to make the tube possesses a decided advantage in that the serrations are formed on the skelp while the skelp is travelling through the welding machine. The serrated edges remain sharp, and free from dirt and oxidation, resulting in clean metal being welded. If the serrations were formed by a prior treatment in a separate machine, and the skelp handled and transported from one place to another, the edges would gather dirt and probably become rusty, oxidized, and probably the teeth would be bent or flattened down, thereby seriously interfering with the welding process, and resulting in poor welds. These objections are overcome by performing the serrating on the welding machine as shown in Fig. 1.

I claim:—

1. Skelp having serrated edges, said serrations being cut in directions to produce a "cross-hatching" contact when the skelp is formed into a tube and said edges are pressed together.

2. Skelp having serrated welding edges, said serrated edges cooperating with each other to form a butt seam weld and arranged to produce molten metal retaining recesses in said seam when the skelp is formed into a tube, and said edges are pressed into welding contact with each other.

3. The method of electric tube welding, which comprises producing serrations upon one of the welding edges of a skelp, forming the skelp into a tube-shape, pressing said serrated edge against the other edge to form a tube, and passing an electric current across the joint through the sharp edges of said serrations.

4. The method of electric tube welding, which comprises producing a multiplicity of sharp cutting and puncturing serrations upon the welding edge of a skelp, forming the skelp into a tube-shape, pressing said edge against the other edge with sufficient pressure to cut and puncture the metal of said second edge, and passing an electric welding current through said contact while under the cutting and puncturing pressure.

5. The method of electric tube welding, which comprises producing serrations upon the welding edges of the skelp, shaping said skelp into a tube and producing a cross-hatched contact between the contacting serrations.

6. The method of electric tube welding which comprises producing metal-retaining recesses upon the edges of the skelp, forming the skelp into a tube, and passing an electric welding current across the high contacting points surrounding said recesses.

7. The method of electric tube welding which comprises producing an interlaced uniformly distributed multiplicity of contact points in the seam to be welded, passing an electric current therethrough and thereby producing a multiplicity of electrically heated localized particles of super-molten metal upon the contacting edges to be welded, and fusing the surface films of adjacent unfused metal by said particles of super-molten metal, forming a homogeneous weld.

8. The method of electric tube welding which comprises producing an interlaced multiplicity of recesses upon the edges to be welded, passing an electric current therethrough, and thereby producing a multiplicity of electrically heated localized particles of molten metal upon the walls of the recesses at the points of contact of the opposing edges to be welded, and applying controlled pressure to retain said particles of molten metal within the area of the edges to be welded.

9. An electric tube welding machine comprising means to produce a serrated edge on the skelp while travelling therethrough, thereby delivering fresh clean serrations to the welding electrodes, and means to electrically weld the serrated skelp.

10. An electric tube welding machine comprising serrating rolls and electric welding electrodes, and means to move skelp through the serrating rolls and in contact with the electrodes.

11. An electric tube welding machine comprising serrating rolls, electric welding electrodes, means to move skelp through the serrating rolls, and to shape the serrated skelp into a tube form, and to move the tube form into contact with the welding electrodes and weld the edges of the skelp together.

12. An electrically butt welded tube having a joint comprising a multiplicity of opposing cross contacting ridges, said opposing ridges welded together at the points of contact.

13. An electrically butt welded tube having a joint substantially flush with the walls of the tube and free from burrs, and comprising a multiplicity of opposing cross contacting ridges, said opposing ridges welded together at the points of contact.

14. An electrically butt welded tube having a joint substantially flush with the walls of the tube and substantially free from burrs comprising a multiplicity of opposing cross contacting ridges and an area of cooperating interlaced recesses within the joint, said opposing ridges welded together at the points of contact, and the weld completed by the melted metal produced at the cross contacting ridges being retained within the mesh work of the cooperating interlaced recesses and fused with the walls thereof.

15. The method of welding which consists of passing the seam progressively through a zone of welding current, and rough dressing the surfaces to be welded immediately preliminary to the welding so that a bright clean surface is presented for union.

16. In an electric welding machine, the combination with means for conducting current to the stock and means for moving the stock through the machine, of a tool for rough dressing a surface to be welded, said tool being located in advance of the path of the welding current in the stock and operating on the stock as the latter advances to said path.

17. In a butt-welding tube machine, the combination with a forming mill, electrode rolls on opposite sides of the seam and stock supporting means adjacent the electrode rolls, of a nurling tool to serrate an edge of the tube stock.

18. The subject of claim 17 characterized by the fact that the nurling tool is located in advance of the forming mill.

19. The subject of claim 17 characterized by the fact that there is a nurling tool to serrate each edge of the tube stock.

20. In an electric butt-welding machine, the combination with the welding electrodes and means for causing the stock to travel therebetween for progressive welding, of means for slotting an edge of the stock, in advance of the electrodes, as the stock travels along.

21. In an electric butt-welding machine, the combination with the welding electrodes and means for causing the stock to travel therebetween for progressive welding, of means for slotting both edges of the stock in advance of the electrodes, the slots being so arranged that the slots of the two edges cross each other as the edges are brought together for welding.

22. The method of electric tube butt welding, which comprises reducing the area of contact between the edges of the skelp to be welded to a net work of distributed isolated points, and passing an electric welding current across the contacting edges at the net work of isolated points.

23. The method of electric tube butt seam welding which comprises producing a uniformly distributed series of irregularities on an edge of the skelp to be welded, said irregularities on one edge consisting of closely associated substantially parallel oblique ridges and depressions, shaping the skelp into a tube form, and passing an electric welding current across the crests of the oblique ridges on the contacting edges of the skelp.

24. The method of electric tube butt seam welding which comprises producing a uniformly distributed series of irregularities on each edge of the skelp to be welded, said irregularities consisting of closely associated ridges and depressions, shaping the skelp into a tube form, the ridges on one edge having a direction that will cross the ridges on the other edge, pressing said edges into contact, and passing an electric welding current across the crests of the ridges on the contacting edges of the skelp.

25. A method of butt welding the edges of a seam which comprises creating an interlaced net work of points of contact between the contacting edges of said seam, and progressively passing said seam through a zone of welding current and pressure.

26. The method of butt-joining a long seam which consists in serrating the two edges to be joined, the serrations of one edge being at an angle to the serrations of the other so that the serrations cross each other when the edges are abutted, and then passing the seam progressively through a zone of welding current and pressure, the current and pressure being sufficient to weld the edges continuously lengthwise of the seam.

27. The method of making a tube which consists of acting on the edges of the flat stock by nurling tools to serrate said edges, the serrations of the two edges being at an angle to each other upon folding into a tube shape, passing the serrated stock through a forming mill to fold the stock into tube shape, and passing the folded stock through a zone of welding current and pressure, with the edges substantially in butted relation, to weld the same, the serrating, folding and welding being carried on simultaneously on the same piece of stock in the order indicated, and progressively from one end of the stock to the other.

28. The method of forming a long seam which consists in passing the seam progressively through a zone of welding current and pressure, and producing deformable areas upon the stock adjacent the surfaces to be welded to render the same, at a point in advance of or at the beginning of the current zone, more compressible than the untreated stock.

29. The method of butt-welding a seam which consists in passing the seam progressively through a zone of welding current and pressure with the edges of the metal substantially in butted relation, and before the metal reaches the said zone producing deformable areas upon said edges to increase the compressibility thereof.

30. The method of butt-welding a long seam which consists in passing the seam progressively through a zone of welding current which is broad relative to the speed at which the seam travels, the edges to be joined bearing a multiplicity of deformable ridges and being substantially in butted relation, and causing said edges to be brought into initial current conducting contact progressively at a succession of points produced by crossing said ridges.

31. The continuous method of preparing a long narrow surface of traveling metal to be electrically welded into a long seam, which comprises progressively mechanically treating said surface while traveling and creating thereon an elongated narrow area of closely associated separated surfaces exposing unfilmed metal and thereafter quickly welding said travelling metal into a seam at the prepared surface.

32. The continuous method of preparing a long narrow surface to be electrically welded into a long seam, which comprises progressively subjecting such long narrow surface to the action of an intermittent film cutting agent, progressively cutting the surface film intermittently by said agent and exposing a long surface of intermittent areas of clean unfilmed metal to another long surface of metal, and electrically welding the same.

33. The continuous method of preparing a long narrow surface to be electrically welded into a long seam, which comprises progressively subjecting such long narrow surface to the action of an intermittent film cutting and ridge forming agent, progressively cutting the surface film and producing an intermittent series of elevated ridges in said surface by said agent and exposing intermittent areas of clean unfilmed metal at such elevated ridges, and electrically welding said long surface of intermittent areas of clean unfilmed metal at the elevated ridges to another long surface of metal.

34. The method of welding a long seam which comprises preliminarily serrating a longitudinally extensive surface to produce closely-spaced teeth thereon, said surface to be subsequently electrically welded to another surface when brought into contact therewith, progressively pressing said serrated, longitudinal areas together and at the same time progressively passing an electric welding current across the joint through said serrations while under pressure.

35. The method of welding a long seam which comprises preliminarily serrating the two longitudinally extensive surfaces to be subsequently welded to produce closely-spaced teeth that cross each other when brought into contact, progressively pressing said serrated, longitudinal areas together and at the same time progressively passing an electric welding current across the joint through said serrations while under such pressure.

36. The method of welding a long seam which consists in serrating the two longitudinally extensive surfaces to be welded to produce closely-spaced teeth that cross when brought into contact, progressively pressing said serrated, longitudinal areas together and at the same time progressively passing an electric welding current across the joint through said serrations while under such pressure.

In testimony whereof I hereby affix my signature.

JOSEPH W. HARRIS.